Patented Jan. 3, 1933

1,892,767

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF AMMONIA

No Drawing. Application filed June 9, 1928. Serial No. 284,280.

This invention relates to the catalytic oxidation of ammonia to oxides of nitrogen.

In the past, ammonia has been oxidized to oxides of nitrogen at elevated temperatures by means of air or other oxidizing gases in the presence of contact masses, usually platinum gauze. The present invention is directed to the catalytic oxidation of ammonia in the presence of a new class of contact masses. The contact masses used in the present invention contain base exchange bodies, either zeolites or non-silicious, which have been caused to react with compounds having acid radicals capable of forming with the base exchange bodies salt-like bodies. It should be understood that the term "base exchange body" as used throughout this specification and claims is strictly limited to complex compounds, such as the zeolites or their non-silicious analogues which are capable of exchanging certain of their bases for the bases of salts in solution, the process being reversible. The definition expressly excludes compounds which are able to exchange their bases in ordinary metathesis but where such exchange is not reversible.

The base exchange bodies which are used to form salt-like bodies may or may not possess high base exchange power since the catalytic value of the final composition is not solely dependent on the amount of base exchanging power present. It should be understood, however, that the term "base exchange body" as used in the present invention includes only such bodies which when freshly prepared possess some base exchange power.

There are three classes of base exchange bodies which can be used to form salt-like bodies for the contact masses of the present invention:—(1) two-component zeolites, that is to say silicious base exchange bodies which are the reaction products of at least one silicate and either one or more metallates or one or more salts, the basic radicals of which contain metals capable of entering into the non-exchangeable nucleus of a zeolite; (2) multicomponent zeolites which are the reaction products of at least one soluble silicate, at least one metallate, and at least one metal salt, the basic radical of which contains a metal capable of entering into the non-exchangeable nucleus of the zeolite; (3) non-silicious base exchange bodies which are normally the reaction products of metallates and metal salts, or in some cases may be prepared by the addition of alkali to certain metal salts or acids to certain metallates, the reaction mixtures being neutral or alkaline to phenolphthalein. All of the three classes of base exchange bodies may be prepared in solutions which at least after the reaction is complete, are alkaline to litmus and for products of maximum base exchange power neutral or alkaline to phenolphthalein.

The base exchange bodies which react to form salt-like bodies used in the contact masses of the present invention may be diluted or undiluted. For best results, however, in some cases it is advantageous to use base exchange bodies which have been homogeneously diluted with suitable diluents, such as, for example highly porous diluents, preferably to form a homogeneous structure.

Catalytically active components may be associated with salt-like bodies of diluted or undiluted base exchange bodies in four main forms:—(1) They may be physically admixed with or impregnated into the base exchange bodies used. (2) They may be physically homogeneously incorporated into the base exchange bodies before the latter have been completely formed in the form of catalytically active diluents or relatively inert diluents which have been impregnated with catalytically active substances. (3) They may be chemically combined in the base exchange bodies in exchangeable or non-exchangeable form. (4) They may constitute part or all of the acid radicals reacting with the base exchange bodies to form the salt-like bodies. Obviously, of course, the same or different catalytically active components may be present in more than one of the above described forms and the wide variety of forms in which they can be introduced is an important advantage of the present invention.

The base exchange bodies used in the present invention, of course, vary widely in their chemical characteristics, but they all possess a similar physical structure which is characterized by more or less high porosity, frequently microporosity, and great resistance to high temperatures.

The base exchange bodies used in the present invention behave as if they were products of extremely high molecular weight for catalytically active components can be introduced in practically any desired proportions and the ordinary law of chemical combining proportions appears to be without force, which makes it reasonable to assume that the molecular weight is so high as to completely mask the effect of the law. It is, of course, possible that the base exchange bodies or some of them may be solid solutions of a plurality of related compounds of lower molecular weight. This question has not been definitely settled as the base exchange bodies are not readily capable of structural chemical analysis. The present invention is, of course, not limited to any theory but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the catalytic oxidation of ammonia and in all cases the contact masses produced are highly effective by reason of the desirable physical structure of the base exchange bodies, which physical structure is, of course, shared by the salt-like bodies or products. The possibility of homogeneous dilution of catalytically active molecules or atoms within wide limits also results in a most desirable uniformity and smoothness of action.

Another important advantage of contact masses containing salt-like bodies lies in the fact that these contact masses are extremely resistant to the high temperatures which obtain in the oxidation of ammonia, temperatures which may range from 500–800° C. or in some cases even higher.

In addition to the important characteristics with which the salt-like bodies of base exchange bodies endow the contact masses of the present invention, it has been found that in many cases it is desirable to stabilize the contact masses and this may be effected by associating with or incorporating or forming therein compounds of the alkali forming metals, that is the alkali metals, the alkaline earth metals, and the strongly basic earth metals. These compounds appear to slow up or smooth out the catalytic reaction and will be referred to throughout the specification and claims as stabilizers. The stabilizers may be non-alkaline, weakly alkaline, or strongly alkaline depending on the nature of the contact mass desired and the reaction conditions under which it is to be used. It is an important advantage of the present invention that in the formation of most of the base exchange bodies used to prepare the contact masses alkali forming metal oxides are present as exchangeable bases. The stabilizers are, therefore, in an extremely fine state of division throughout the desirable porous structure of the contact masses and are therefore in a form in which they are peculiarly effective.

In addition to the use of stabilizers which are important in connection with many of the contact masses used in the present invention, it has been found that stabilizer action and the overall efficiency of the contact masses can in many cases be greatly increased or enhanced by the association therewith or chemical combination therein of elements or radicals or groups which are catalytically active but which do not possess specific catalytic activity for the oxidation of ammonia to oxides of nitrogen. Thus, for example, it will be noted that the reaction involves the production and splitting off of water. For this reason it is desirable in many of the contact mass compositions of the present invention to incorporate or include catalysts or catalytic components which are not specific catalysts for the oxidation of ammonia to the oxides of nitrogen but which may favor dehydration. In other cases, different non-specific catalysts may be used and are of importance. Thus, for example, when coal tar ammonia is being oxidized it is necessary to burn out the organic impurities present and while some catalytic components which are oxidizers of ammonia to oxides of nitrogen also favor the selective catalytic combustion of organic impurities in other contact masses, components may be incorporated which favor the selective catalytic combustion of organic and inorganic impurities or their transformation into compounds which are harmless or easily separated from the final product and these components may not be specific catalysts for the oxidation of ammonia to oxides of nitrogen, at least under the reaction temperature used. In this connection, it should be noted that the action of catalyst varies with the temperature and in some cases a particular component may be a specific catalyst at one temperature while at another, frequently at a lower temperature, it is no longer a specific catalyst. These non-specific catalysts will be referred to throughout the specification and claims as stabilizer promoters and the expression is intended to have no other meaning. The concept of stabilizer promoters is therefore not intended to define the chemical individuals or groups but is relative and refers to the action of the catalytic groups under the reaction conditions obtaining. The use of the expression stabilizer promoter should in no sense be taken to limit the invention to a particular theory of action of these non-specific catalysts and in fact in some cases stabilizer promoters may be present where there are no stabilizers.

The base exchange bodies used in preparing the contact masses of the present invention may be produced by wet or fusion methods and when produced by wet methods it is preferable to add the relatively more acid components to the relatively more alkaline components, as has been stated above, as this procedure results in excellent products with a minimum of skilled supervision.

In the preferred embodiment of the present invention in which diluted base exchange products are used the range of choice of diluents is very great. Some diluents are inert, some are stabilizing, others are activating, catalytically active or stabilizer promoters. A few of the diluents will be briefly enumerated:—natural or artificial powders of rocks, stones, tuffs, trass, lava, and similarly volcanic products which are frequently highly porous, greensand, pulverized slag wool, cements, sand, pulverized earthenware, fuller's earth, talc, glass powder, pumice meal, asbestos, graphite, activated carbon, quartz meal, various pulverized minerals rich in quartz, metal powders and metal alloy powders, salts of oxymetal acids such as tungstates, vanadates, chromates, uranates, manganates, cerates, molybdates, etc., particularly iron, silver, thorium, copper salts of the above, silicates, such as copper silicate, iron silicate, nickel silicate, cobalt silicate, aluminum silicate, titanium silicate, zircon, minerals or ores, especially those rich in copper, and iron etc. Finely divided diluents are of great advantage, especially when the average particle size is less than 60 microns, in which case the diluents possess high surface energy, which increases the adsorptive and absorptive capacity of the contact mass, the diffusion speed and porosity. These finely divided diluents may be considered as physical catalysts or activators. Diluted or undiluted base exchange bodies or their derivatives, silicious or non-silicious, may be finely divided and used as part or all of the diluents of the base exchange bodies used in the contact masses of the present invention.

The following nine methods are the most effective for the introduction of diluents but any other suitable methods can be used:

(1) The diluents may be mixed with one or more liquid components of the base exchange body to be formed when the latter are prepared by wet methods.

(2) Components, either catalytically active, stabilizer promoters, or others, may be precipitated or impregnated into diluent bodies which are then incorporated into the base exchange body by any suitable methods of incorporation.

(3) Diluents may be mixed with the base exchange bodies when the latter are still in the form of gels, by kneading or stirring, in which case the base exchange gel behaves as an adhesive. The homogeneity and uniformity of the distribution of the diluents is of course not quite so great by this method as by method (1), but for the oxidation of ammonia extreme uniformity is not essential.

(4) Diluents may be formed during the formation of the base exchange bodies by mixing suitable compounds with the components of the base exchange bodies so that the diluent particles are precipitated during formation. Protective colloids may be added to prevent coagulation of the diluent particles before the base exchange bodies become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form insoluble diluents, as, for example, with heavy metal oxides.

(6) Preformed base exchange bodies, diluted or undiluted, artificial or natural, can be impregnated with true or colloidal solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which after formation retains the compounds in solution and is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The metal compounds which are capable of forming a portion of the nucleus of the base exchange body either in the form of metallates or metal salts are the following:— copper, silver, gold, bismuth, beryllium, zinc, cadmium, boron, aluminum, titanium, zirconium, tin, lead, thorium, niobium, antimony, tantalum, chromium, molybdenum, tungsten, uranium, vanadium, manganese, iron, nickel, cobalt, platinum, palladium, and in some cases the alkali metal salts of metalloids, such as boron, phosphorus and nitrogen may also be used. Some of the metals are specific catalysts for the oxidation of ammonia, others are stabilizers and still others are stabilizer promoters.

The exchangeable bases of the base exchange bodies may be substituted by base exchange, and the elements which can be introduced singly or in admixture by base exchange are the following:—copper, silver, gold, ammonium, beryllium, calcium, manganese, zinc, strontium, cadmium, barium, lead, aluminum, tantalum, zirconium, tin, antimony, thorium, vanadium, thallium, bismuth, chromium, uranium, manganese, iron cobalt, nickel, palladium, platinum, and cerium.

The exchangeable bases introduced may be specific catalysts, they may be stabilizers, or they may be stabilizer promoters. They may be introduced as simple ions or as complex ions and may enhance the catalytic activity of the final contact mass, improve its physical strength, or both.

The acid radicals which are capable of forming salt-like bodies with the base exchange bodies includes acids of the metals of the fifth and sixth groups of the periodic system, such as vanadium, tantalum, tungsten, uranium, chromium, molybdenum and the like. Acids of the metalloids, such as sulfur, boron, phosphorus, nitrogen and the like may be used.

The base exchange bodies may also be coated in the form of films on massive carrier granules or may be impregnated therein. The massive carriers may be inert, activating, or themselves catalysts.

The present invention may be carried out as a single catalytic reaction, namely, the oxidation of ammonia to oxides of nitrogen, and where a pure ammonia, such as, for example, ammonia catalytically synthesized from its elements, is used this will be the normal reaction. It is, however, an advantage of the present invention that effective composite contact masses may be used and impure ammonia can be oxidized with concomitant selective transformation of impurities into easily separable or unobjectionable products. Thus, for example, ammonia produced as a by-product from the distillation of coal, wood, and other products is normally contaminated with considerable amounts of organic impurities or impurities containing sulfur, either inorganic, such as hydrogen sulfide, or organic. It is quite common for such by-product ammonia to contain considerable amounts of phenols. When such an impure ammonia is passed over a suitable contact mass containing a salt-like base exchange body the organic and other impurities are oxidized to easily separable or harmless products and at the same time the ammonia is oxidized to oxides of nitrogen. Naturally, of course, the reaction may or may not be absolutely simultaneous and there is reason to believe that with composite contact masses a selective oxidation of impurities takes places before the ammonia is oxidized. In some modifications of the present invention it is also desirable to arrange the catalyst in zones, for example, permitting gases first to encounter the contact masses which favor the selective oxidation of impurities and then to encounter a contact mass which permits the oxidation of ammonia to oxides of nitrogen. The zones may be separated or contiguous.

The present invention is not concerned with a particular temperature and the temperature ranges which have been used with other contact masses and which normally run from 500–800° C. may be employed and the optimum temperature will, of course, depend on the precise nature of the contact mass utilized. The proportions of reacting ingredients may also vary and the reaction may be carried out at atmospheric pressure or at pressures above or below atmosphere. A few representative processes coming within the scope of the present invention will be set forth in greater detail in the following specific examples, it being clearly understood that the invention is not limited thereto.

*Example 1*

1. 24 parts of $SiO_2$ in the form of a 33° Bé. sodium waterglass solution are diluted with 6–7 volumes of water.

2. A 5% sodium aluminate solution is prepared containing 5 parts of $Al_2O_3$ in the form of a hydroxide freshly precipitated from the corresponding aluminum nitrate solution.

3. 50 parts of ferric nitrate with 9 mols of water are dissolved in water to form a 10% solution.

50 parts of a mixture of rare earths or monazite sand or monazite sand refuse are added to solution #1. The aluminate is then poured in with vigorous agitation and finally the ferric nitrate solution is introduced in a thin stream while maintaining the vigorous agitation until the reaction mixture remains slightly alkaline to phenolphthalein. A gelatinous precipitate is obtained which consists of a diluted three-component zeolite. The gel is separated from the mother liquor by pressing, washed with water, and dried at temperatures preferably below 100° C. The dried cake is broken into pieces and hydrated with water. The exchangeable alkali metal base of the zeolite can then be replaced by one or more metal oxides having either catalytic activity, stabilizer activity or stabilizer promoter activity. Base exchange is performed in the usual manner by trickling 3–5% solutions of the desired salt over the zeolite preferably at 40–60° C. or by suspending the zeolite in the salt solution. Salts of calcium, manganese, barium, silver, copper, zinc, cerium, cobalt, manganese, and lead, either singly or in admixture are suitable for this step and favorably affect the catalytic efficiency of the final contact mass.

The zeolite is then treated with solutions containing acid radicals which form salt-like bodies, for example, the acids or the corresponding salt-solutions of the metal acids of the fifth and sixth groups of the periodic system, such as vanadium, tantalum, bismuth, chromium, molybdenum, tungsten, uranium, or manganese. The zeolites can be advantageously impregnated by dilute solutions of the ammonium salts of the above referred to acids, such as, for example 1% solutions of ammonium vanadate, ammonium tungstate, or ammonium molybdate. If desired the salt solutions may be trickled over the zeolites instead of impregnated in them.

The contact mass compositions obtained are highly effective especially when more or less of the exchangeable alkali metal bases have been replaced by heavy metal oxides, such as those of iron, copper, cobalt, manganese, nickel or silver. The zeolite obtained, for example, is treated with a 5% silver nitrate solution in order to extensively replace the alkali metal by silver and after washing a 5% potassium bichromate solution is trickled over in order to produce the salt-like body. The contact mass is placed in a converter and an ammonia air mixture containing 7-9% ammonia is passed over it at 700-800° C. Excellent yields of nitrogen oxides are obtained and the contact mass shows great resistance to the high temperatures.

Other modified contact masses can be produced if the aluminate is partly or entirely replaced by other metallates, such as metallates of lead, zinc, chromium, vanadium, or a mixture of them. Similarly, part or all of the ferric nitrate solution can be replaced by one or more solutions of salts of manganese, zirconium, copper, chromium, aluminum, cadmium, titanium or lead. The proportions of the component solutions may be changed within wide limits.

*Example 2*

25 parts of zinc oxide in the form of potassium zincate are dissolved in water to form a 10% solution. To this solution potassium plumbite is added containing 2.5 parts of $PbO_2$. A concentrated solution of aluminum nitrate and chromium nitrate is prepared containing 7.5 parts of $Al_2O_3$ and 5 parts of $Cr_2O_3$. The aluminum nitrate-chromium nitrate solution is added to the zincate-plumbite solution until the reaction mixture is neutral to phenolphthalein. A gel precipitates out, and after separation from the mother liquor in the usual way it forms a non-silicious base exchange body containing zinc, lead, aluminum and chromium. The product is thoroughly pressed and dried, preferably at a temperature of from 80-90° C., and thereupon the material is put on a nutsch filter and warm water is trickled over it in order to hydrate it. After hydration a 5-10% copper nitrate solution is trickled over it to replace a maximum of alkali by CuO.

After the base exchange is completed the product is caused to react with a 1% ammonium vanadate solution, which may, for example, be trickled over the base exchange body. The vanadate of the base exchange body is formed and the excess ammonium vanadate is washed out. Thereupon the contact mass is ready for use, and when an ammonia-air mixture, containing 7-9% ammonia, is passed over it at 700-900° C. good yields of nitrogen oxides are obtained.

Modified contact masses may be prepared by substituting part or all of the metallates or metal salts for other metallates or metal salts. Other elements can also be introduced by base exchange, such as iron, thorium, chromium, manganese, cerium, nickel, cobalt, etc., singly or in admixture.

Instead of forming the vanadate of the base exchange body other metal acids or their salts can be used such as other metal acids of the fifth and sixth groups of the periodic system, for example the acids containing chromium, molybdenum, tungsten, etc.

If the physical strength of the salt like body contact masses is not adequate basic adhesives such as MgO, CaO and the like, may be used, and if desired the contact mass may be formed into suitable pieces, or pellets, before use.

In many cases it is advantageous to coat the contact mass onto carrier fragments, such as for example bauxite, diaspore, ilmenite and the like, using the adhesives above described.

What is claimed as new is:

1. A method of oxidizing ammonia to oxides of nitrogen, which comprises passing ammonia admixed with an oxygen containing gas at an elevated temperature over a contact mass containing specific catalysts for the oxidation of ammonia and also containing reaction product of a base exchange body with a compound containing as an acid radical a compound of a metal of the 5th and 6th groups of the periodic system capable of reacting therewith to form a salt-like body, said reaction component containing no ingredients which are poisons for the reaction being carried out.

2. A method of oxidizing ammonia to oxides of nitrogen, which comprises passing ammonia admixed with an oxygen containing gas at an elevated temperature over a contact mass containing specific catalysts for the oxidation of ammonia and also containing diluted reaction product of a base exchange body with a compound containing as an acid radical a compound of a metal of the 5th and 6th groups of the periodic system capable of reacting therewith to form a salt-like body, said reaction component containing no ingrediets which are poisons for the reaction being carried out.

3. A method of oxidizing ammonia to oxides of nitrogen, which comprises passing ammonia admixed with an oxygen containing gas at an elevated temperature over a contact mass containing specific catalysts for the oxidation of ammonia and also containing reaction product of a base exchange body with a compound containing as an acid radical a compound of a metal of the 5th and 6th groups of the periodic system capable of reacting therewith to form a salt-like body, at least one of the catalytically effective components of the contact mass being chemically combined in the base exchange body, said reaction component containing no ingredients which are poisons for the reaction being carried out.

4. A method of oxidizing ammonia to oxides of nitrogen, which comprises passing ammonia admixed with an oxygen containing gas at an elevated temperature over a contact mass containing a reaction product of a base exchange body with a compound containing as an acid radical a compound of a metal of the 5th and 6th groups of the periodic system capable of reacting therewith to form a salt-like body, at least one of the catalytically effective components of the contact mass being chemically combined in the base exchange body in non-exchangeable form said reaction component containing no ingredients which are poisons for the reaction being carried out.

5. A method of oxidizing ammonia to oxides of nitrogen, which comprises passing ammonia admixed with an oxygen containing gas at an elevated temperature over a contact mass containing a diluted reaction product of a base exchange body with a compound containing as an acid radical a compound of a metal of the 5th and 6th groups of the periodic system capable of reacting therewith to form a salt-like body, at least one of the diluents being catalytically active, said reaction component containing no ingredients which are poisons for the reaction being carried out.

6. A method of oxidizing ammonia to oxides of nitrogen, which comprises passing ammonia admixed with an oxygen containing gas at an elevated temperature over a contact mass containing a reaction product of a base exchange body with a compound containing as an acid radical a compound of a metal of the 5th and 6th groups of the periodic system capable of reacting therewith to form a salt-like body, the contact mass containing at least one stabilizer said reaction component containing no ingredients which are poisons for the reaction being carried out.

7. A method of oxidizing ammonia to oxides of nitrogen, which comprises passing ammonia admixed with an oxygen containing gas at an elevated temperature over a contact mass containing a reaction product of a base exchange body with a compound containing as an acid radical a compound of a metal of the 5th and 6th groups of the periodic system capable of reacting therewith to form a salt-like body, the contact mass containing at least one stabilizer promoter said reaction component containing no ingredients which are poisons for the reaction being carried out.

8. A method of oxidizing impure ammonia containing oxidizable impurities, which comprises bringing about reaction between the ammonia and an oxygen containing gas at an elevated temperature in the presence of a contact mass, containing a reaction product of a base exchange body with a compound containing as an acid radical a compound of a metal of the 5th and 6th groups of the periodic system capable of reacting therewith to form a salt-like body and favoring the selective oxidation of impurities said reaction component containing no ingredients which are poisons for the reaction being carried out.

9. A method of oxidizing ammonia to oxides of nitrogen, which comprises passing ammonia admixed with an oxygen-containing gas at an elevated temperature over a contact mass containing a reaction product of a base exchange body with a compound containing as an acid radical a compound of a metal of the 5th and 6th groups of the periodic system capable of reacting therewith to form a salt-like body, at least one of the catalytically effective components being present as at least one of the acid radicals reacting with the base exchange body to form the salt-like body, said reaction component containing no ingredients which are poisons for the reaction being carried out.

Signed at Pittsburgh, Penn., this 8th day of June, 1928.

ALPHONS O. JAEGER.